United States Patent [19]

Blank, Sr. et al.

[11] 4,002,313
[45] Jan. 11, 1977

[54] AIRCRAFT CONFORMAL LOAD CARRYING PALLET

[75] Inventors: Walter G. Blank, Sr., Florissant; Frank Laacke, Des Peres; Jacob W. Priser, St. Charles; Robert W. White, Florissant, all of Mo.

[73] Assignee: McDonnell Douglas Corporation, St. Louis, Mo.

[22] Filed: July 28, 1975

[21] Appl. No.: 599,823

[52] U.S. Cl. .............................. 244/118 R; 220/1.5; 244/117 R
[51] Int. Cl.² ........................................ B64D 9/00
[58] Field of Search ....... 244/118 R, 135 R, 135 B, 244/130, 107, 117 R; 150/.5; 206/335; 220/1.5, 4 B, 22

[56] References Cited

UNITED STATES PATENTS

| | | | |
|---|---|---|---|
| 2,355,084 | 8/1944 | Kurrle | 244/135 B X |
| 2,689,696 | 9/1954 | Gannon | 244/118 R |
| 3,380,691 | 4/1968 | McComas | 244/135 R X |

FOREIGN PATENTS OR APPLICATIONS

| | | | |
|---|---|---|---|
| 656,741 | 1/1929 | France | 244/135 R |
| 718,206 | 3/1942 | Germany | 244/107 |
| 625,064 | 6/1949 | United Kingdom | 244/107 |

*Primary Examiner*—Trygve M. Blix
*Assistant Examiner*—Barry L. Kelmachter
*Attorney, Agent, or Firm*—Gravely, Lieder & Woodruff

[57] ABSTRACT

A form-fitting or conformal load carrying pallet for aircraft to improve the load carrying capacity of aircraft where the load may be fuel, electronic gear, aerial photography equipment or other items. The pallet is arranged for rapid installation and removal from a position against the side of the fuselage so that there is little or no adverse effect on the aircraft weight distribution, so the wetted area of the fuselage is not appreciably increased, so that the effect on aerodynamic characteristics is minimized, and so the pallet does not become a structural part of the aircraft.

6 Claims, 13 Drawing Figures

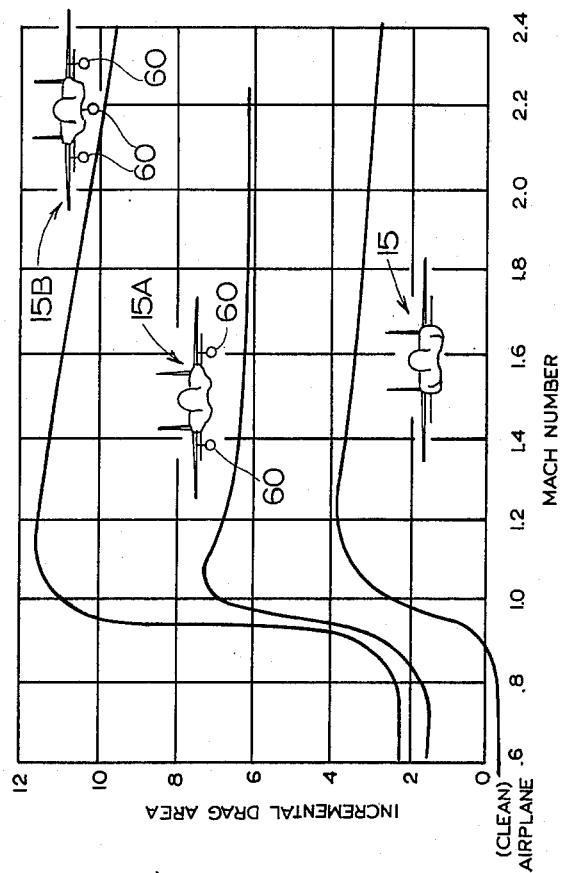
FIG. 12
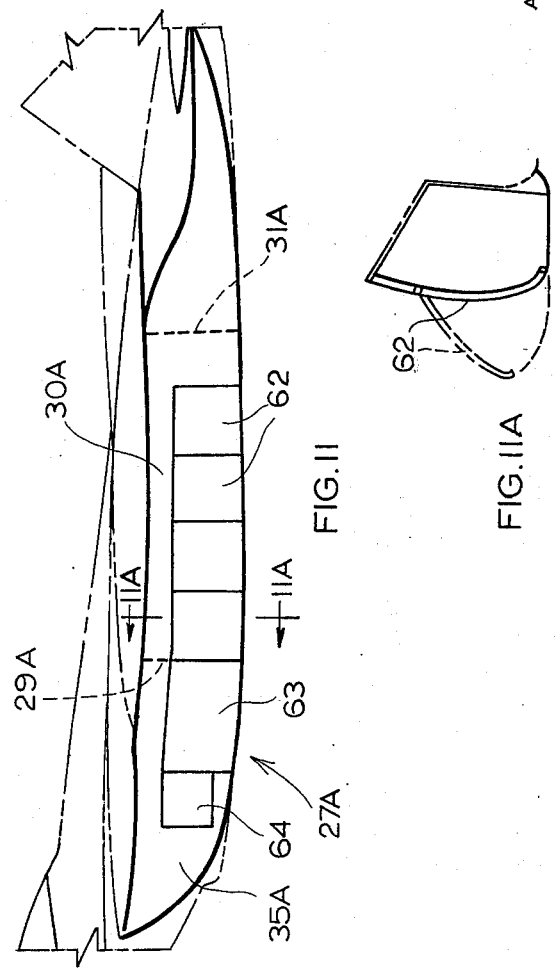
FIG. 11
FIG. 11A
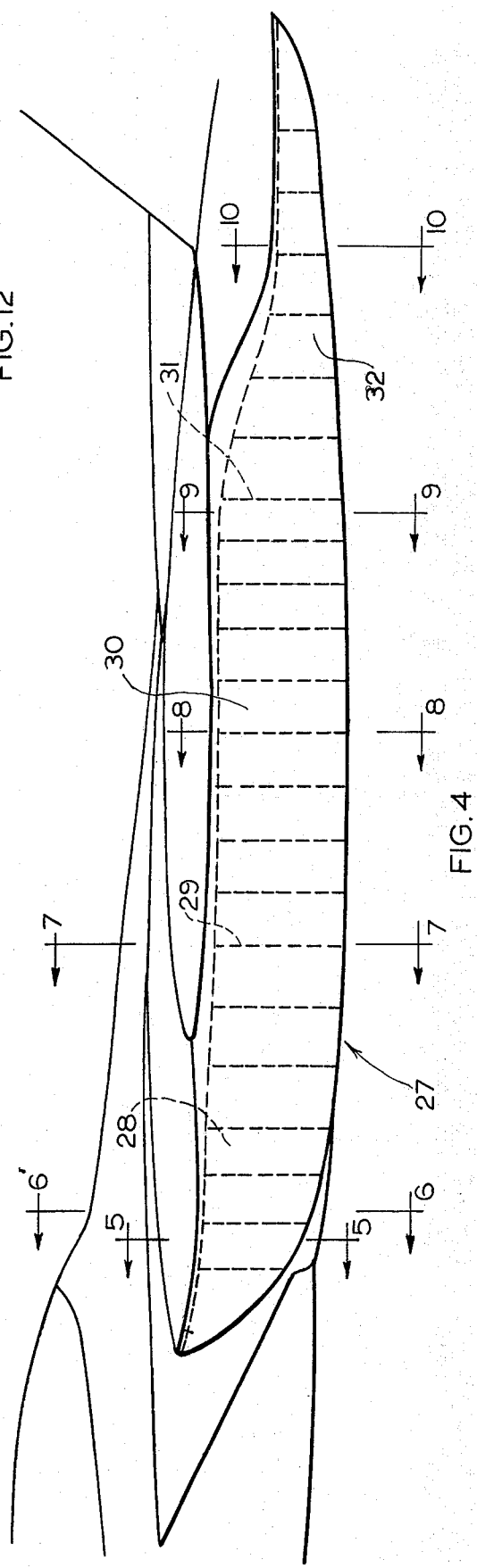
FIG. 4

AIRCRAFT CONFORMAL LOAD CARRYING PALLET

BACKGROUND OF THE INVENTION

This invention relates to conformal load carrying pallets for aircraft and includes means to integrate pallets into the aircraft in a unique manner.

The importance of expanding the load carrying abilities of aircraft with minimum penalty on performance and least call for structural modifications is greater than ever. More and more, air travel and use of aircraft to move loads great distances is assuming greater significance. The ability to utilize existing capital investments in existing aircraft to carry large loads on an "as needed" basis requires lower capital expenditure since larger or new aircraft need not be procured to handle specific load requirements.

The payload in commercial aircraft is important, and having the means to expand payload carrying capability on an as needed basis is very important, especially if it can be done at little penalty to the performance and operating costs of the aircraft. In military aircraft, the need to have maneuverability and speed is of great importance, so the aircraft is kept as small as possible. Of course, external fuel tanks for military and other aircraft have long been the standard way to carry fuel for extended flight range. The standard external tanks normally result in significantly increased drag and significant changes in the stability characteristics and are dropped prior to entering combat because of the speed and maneuverability penalties. This results in a logistics problem and added operating expense.

The principal object of this invention is to provide a unique method of increasing the load carrying versatility of a basic aircraft at known stations along the fuselage a known cross sectional area by forming a pair of load carrying pallets to fit the adjacent wing and fuselage surfaces, and blending the cross sectional areas of the pallets with the aircraft cross section areas at each known station so that the source of interference drag is substantially eliminated and stability and control characteristics of the basic aircraft are not materially changed.

It is also an object to avoid the necessity to jettison the pallets by making them an integral but removable component of a basic aircraft.

BRIEF SUMMARY OF THE INVENTION

The conformal pallet of this invention is made to conform to the surface configuration of the aircraft fuselage so that no significant change in the wetted area results, and so there is a minimum of frontal area which keeps the aerodynamic drag at acceptable values. By being made to conform to the fuselage lines, the sources of interference drag normally associated with pylon mounted tanks and slipper wing tanks are eliminated.

Supersonic installation drag of commercial or military aircraft is minimized by integrating the pallets with the existing fuselage configuration in consideration of the area distribution of the combined configuration. By placing conformal pallets on the sides of the fuselage, the impact on the flow over the wings is kept to a minimum with a resulting negligible impact on stability and flight control characteristics.

The conformal load carrying pallet installation provides a means of carrying external fuel without altering existing configuration lines. Additional volume for carriage of fuel or other equipment can be provided or removed in a minimum of time thus significantly contributing to the flexibility of the original configuration of the aircraft. Structural provisions and modification required in the basic aircraft configuration to carry the conformal load carrying pallets are minimized. A fighter aircraft can be readily switched from a regular fighter to an interceptor, or air-to-ground or reconnaissance roles by utilization of differently equipped pallets. Thus one aircraft is able to do many jobs and specialized aircraft are avoided or are not required. This is a factor which can have a significant impact on procurement costs. Since the penalties associated with the pallet installation are small there is no need to provide a jettison capability. The present concept of the conformal load carrying pallet can be used to significantly increase the radius/range capabilities of a given aircraft configurations without affecting it's store station capability, can increase its flexibility, can provide efficient alternate role flexibility, and can reduce procurement costs by allowing a single aircraft design to function in many roles. Development testing and demonstration requirements are reduced since one type of aircraft can be used for many purposes.

The important objectives of this invention are to provide a load carrying pallet which may be conformed to the fuselage of an aircraft, to provide a pallet of the foregoing character to carry significant amounts of fuel to extend the useful range of an aircraft, and to provide pallet means capable of being used to carry military hardware as well as commercial payloads, typical of which would be the transportation of oil and other liquids.

It is also an objective of this invention to devise a method of increasing the utility and load carrying ability of a given aircraft by the steps of providing aerodynamically shaped load carrying pallets on the aircraft at the fuselage and wing meeting surfaces, so that the drag imposed at subsonic speed is zero and the aircraft aerodynamic characteristics are not changed or the changes are minimized.

A preferred embodiment of the present invention is directed to an aircraft having fuselage and wing root areas at each side of the fuselage in which the wing and fuselage surfaces have predetermined fixed configurations, and wherein the improvement consists in mounting a pair of hollow load carrying pallet bodies against each side of the fuselage and forming the pallet bodies with surfaces that conform to the predetermined configuration of the adjacent wing and fuselage surfaces. In the preferred combination means is provided on the aircraft and on the pallet bodies to provide principal attachment points, as well as means to restrain the pallet bodies against movement.

BRIEF DESCRIPTION OF THE DRAWINGS

A presently preferred embodiment of this invention is shown in the accompanying drawings, wherein:

FIG. 4 is a greatly enlarged longitudinal elevational view of a typical conformal load carrying pallet mounted on the aircraft seen in FIG. 2;

FIG. 11 is a side elevational view of an aircraft equipped with a load pallet having access doors for loading and unloading the pallet;

FIG. 11A is a fragmentary transverse sectional view taken at line 11A—11A in FIG. 11 to show an open door; and FIG. 12 is a graph of the relative drag versus speed between aircraft carrying conventional fuel tanks and the same aircraft having the conformal load carrying pallets of this invention.

DETAILED DESCRIPTION OF THE PREFERRED EMBODIMENT

Figure 3:
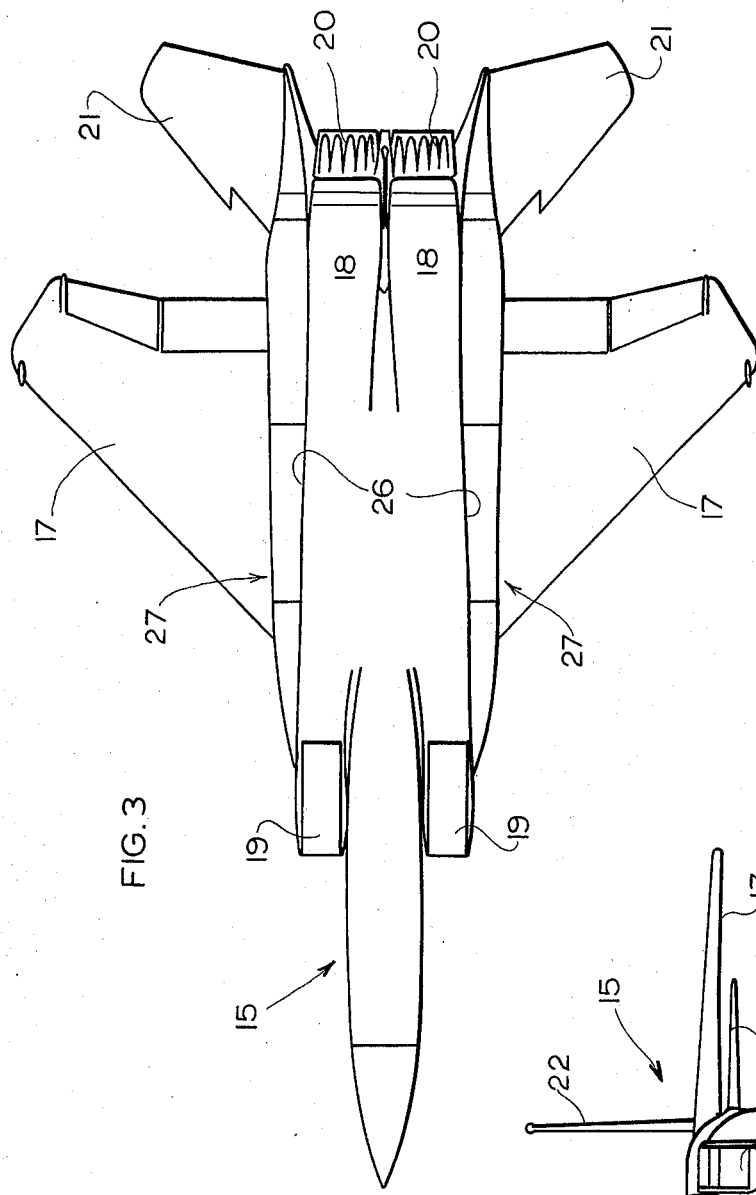
FIG. 3 is a bottom plan view of the aircraft equipped with conformal load carrying pallets.

It should be understood that the conformal load carrying pallets hereinafter to be described may be employed on a variety of aircraft, but for present purposes of description the aircraft shown at 15 is a military type having a longitudinal fuselage 16, a wing 17, and a pair of jet engines 18 submerged in the fuselage and wing root area so that the air inlets 19 are positioned at each side of the forward portion of the fuselage 16 and the exhaust nozzles 20 are positioned between the horizontal stabilators 21 and the vertical stabilizers 22 on which rudder surfaces 23 are operatively mounted. The usual landing gear for the aircraft 15 includes the main gear seen at 24 and the nose gear seen at 25. The aircraft 15 has a wing root area 26 (FIG. 3) with a predetermined surface configuration that forms the location for mounting the load carrying pallets seen at 27. These pallets are made to conform to the surface configuration 26 and to have a streamlined profile which adds an insignificant additional wetted surface to the aircraft fuselage 16, and presents a minimum frontal area which keeps the aerodynamic drag at acceptable values.

The construction of a typical fuel or liquid load carrying pallet may be seen in FIGS. 4 through 10 inclusive, and the description of this pallet will of course apply to the opposite pallet, taking into account that the pallets are constructed for right and left assembly. The general structure of pallet 27 follows a semi-monocoque structure using conventional skin, stringers and frame construction which includes a pair of principal bulkheads (FIGS. 7 and 9) for mounting purposes. As indicated the pallet 27 is formed with a compartment 28 located ahead of the forward principal bulkhead 29 seen in FIG. 7, a mid-compartment 30 located between the forward bulkhead 29 and an aft bulkhead 31 seen in FIG. 9, and the aft compartment 32. The respective bulkheads 29 and 31 have appropriate stiffening ribs, webs and caps to provide the necessary strength for mounting provisions. The bulkhead 29 is provided with a suitable check valve 29A, and a similar check valve 31A is mounted in the bulkhead 31. These valves control the longitudinal movement of liquids when the pallets are utilized for carrying a commodity of this character.

Figure 6:
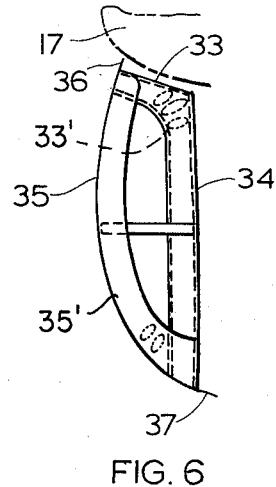
FIG. 6 is a fragmentary transverse sectional view taken at line 6—6 in FIG. 4.
Figure 7:
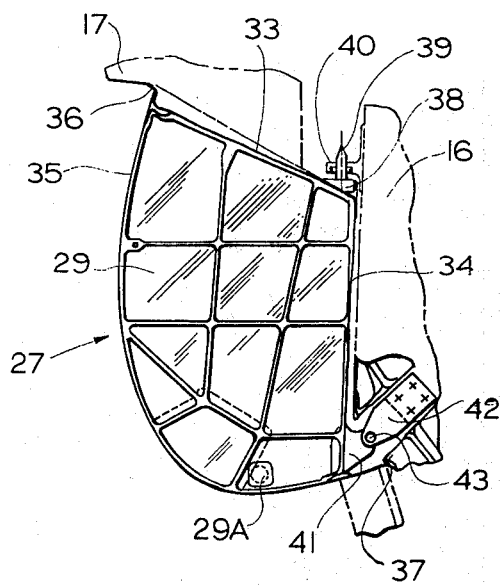
FIG. 7 is a fragmentary transverse sectional view taken through a principal support bulkhead as seen along line 7—7 in FIG. 4.
Figure 8:
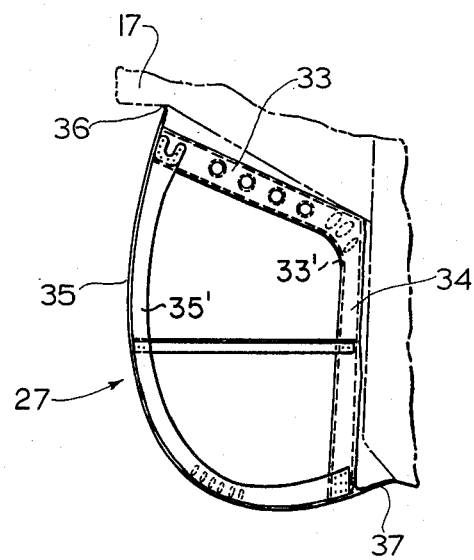
FIG. 8 is a typical transverse section through the pallet frame showing the frame construction along the line 8—8 in FIG. 4.
Figure 10:
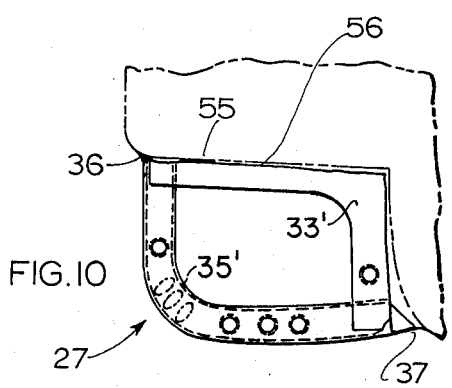
FIG. 10 is a transverse sectional view taken at line 10—10 in FIG. 4, and showing the pallet configuration in the area adjacent to the engine exhaust.

As can be seen in FIG. 7 the wing root area between wing 17 and the adjacent fuselage 16 forms an obtuse angle which dictates the surface configuration so that the pallet has an inboard wall constituted by an upper surface 33 and lateral surface 34 which are shaped to conform to the wing root surfaces, while an exposed wall is formed by the outer skin 35 of the pallet 27 having a shape which has an aerodynamic curvature terminating at an upper margin in a seal strip 36 and at a lower margin in a seal strip 37. In the views of FIGS. 6, 8 and 10 there can be seen the shaping of frame ribs 33' which support the upper skin surface 33 and inboard skin surface 34. These ribs 33' change shape to match the changes in the root area shape. Ribs 33' have cooperating outer ribs 35' which support the outer skin 35, and these ribs also change shape depending on the location. The bulkhead 29 is provided with a boss 38 carrying a locating pin 39 which is designed for insertion in the eye of bracket 40 for the purpose of retaining the pallet 27 against fore and aft, as well as lateral movement, relative to the fuselage 16. The lower inboard corner of the bulkhead 29 is provided with a bracket 41 which is received in a clevis 42 fixed in the adjacent structure of the aircraft. A securing pin 43 connects the bracket 41 to the clevis 42 and is placed in double shear.

Figure 9:
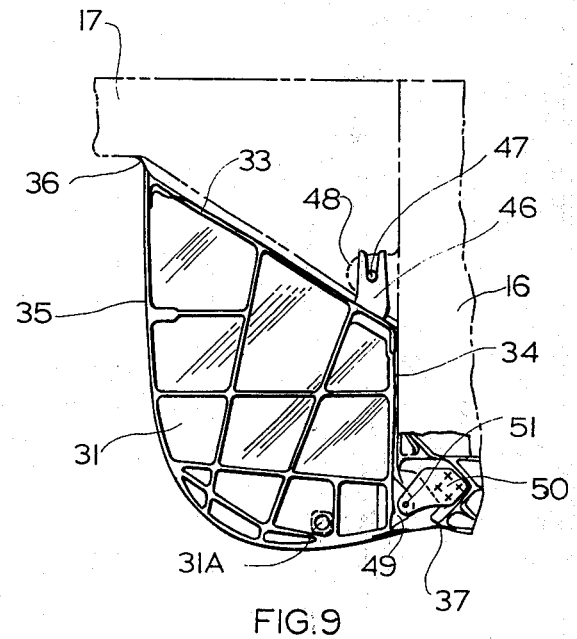
FIG. 9 is another transverse view showing a second principal support for the pallet as seen at the bulkhead shown at line 9—9 in FIG. 4.

FIG. 9 shows the second principal bulkhead 31 having continuation of surfaces 33 and 34 which conform to the adjacent wing root surfaces between the wing 17 and the fuselage 16. The external skin surface 35 at this bulkhead 31 follows a slightly different aerodynamic curvature from that shown in FIG. 7. It is seen that the upper and lower margins of the exterior skin surface 35 at bulkhead 31 is provided with a continuation of the aerodynamic seal 36 and the lower aerodynamic seal 37. The bulkhead 31 is provided with an alignment fork 46 which opens upwardly to engage with a pin 47 carried in a bracket 48 which is fixed to the adjacent structure of the fuselage 16. The fork 46 is formed with a V-shaped recess so that as the fork is moved upwardly relative to the fixed pin 47 there is a resulting camming action which fixes the position of the bulkhead and restrains the pallet against lateral displacement. Simultaneously with the mating of the fork 46 and pin 47 a lower bracket 49 on the bulkhead 31 engages in the fixed clevis 50 on the structure of the fuselage 16 so that a securing pin 51 may connect these two structural parts and place the pin 51 in double shear.

Figure 5:
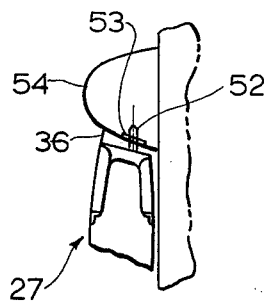
FIG. 5 is a fragmentary transverse sectional view taken along line 5—5 in FIG. 4.

The forward end of the pallet 27, as seen in FIG. 5, is provided with a pin 52 which engages in a perforated plate 53 carried in the fairing 54, thereby stabilizing the forward end of the pallet against displacement. FIGS. 6 and 7 are typical examples of frame structure for supporting the exterior skin 35 of the pallet, and these views illustrate, in combination with FIGS. 5, 7 and 9, the change in configuration of both the exterior skin 35 and the interior surfaces 33 and 34 first referred to in FIG. 7. Throughout the several views it is seen that the aerodynamic seal 36 continues along under the surface of wing 17 and the lower seal 37 continues along in engagement with the surface of fuselage 16.

When the pallet 27 is used for carrying liquids, such as fuel, the skin surface 35 and the interior surfaces 33 and 34 are integrally sealed so that no internal bladder or plurality of bladders is required. The sealing material may be of any suitable character and is carefully inserted during fabrication. In riveted construction it has been found that liquid tight joints may be obtained. The use of the peripheral longitudinal seals 36 and 37 at the pallet-to-aircraft interface materially reduces drag and prevents air pressure build up between the aircraft and the pallet surfaces 33 and 34. The seals are of such character that air pressure, with the aircraft in flight, tends to preload the seals so as to keep them in contact with the surfaces of the wing and fuselage.

Figure 1:
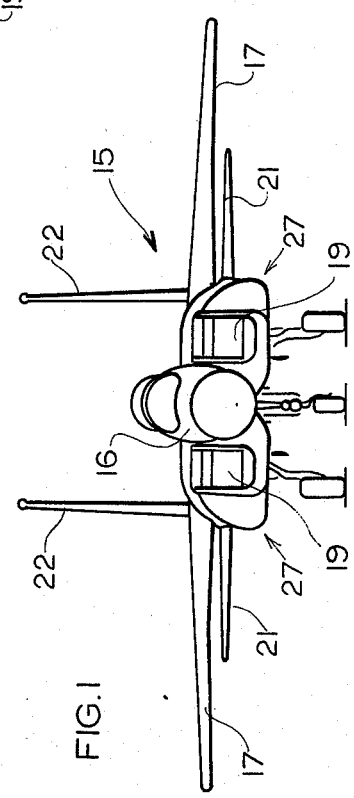
FIG. 1 is a front elevational view of an aircraft provided with the conformal load carrying pallets positioned against the sides of the fuselage and under the wing.
Figure 2:
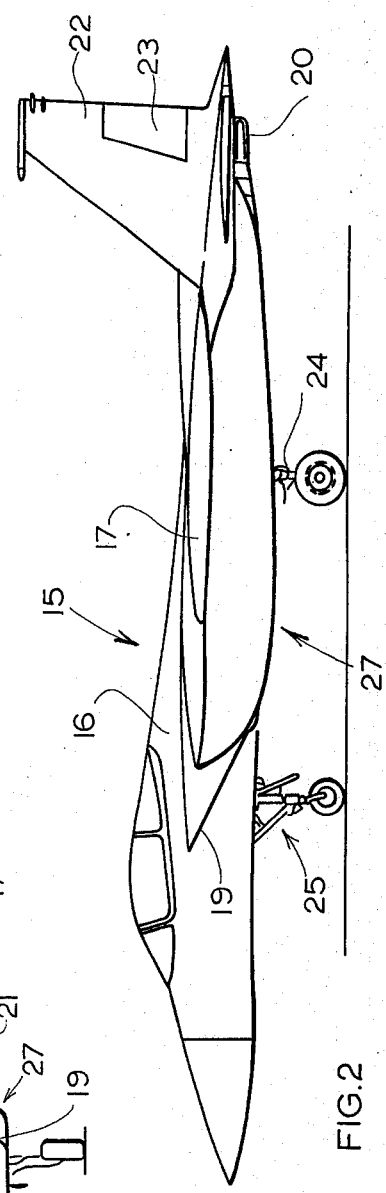
FIG. 2 is a side elevational view of the aircraft seen in FIG. 1 and in which the longitudinal configuration of the load carrying pallets may be seen in relation to the wing and the exhaust area of the aircraft jet engines.

The graph of FIG. 13 is a plot of speed (Mach number) versus incremental drag due to the conformal load carrying pallets and conventional pylon mounted tanks, and illustrates the significant improvement achieved by an aircraft of the type shown in FIGS. 1–3 when carrying the present conformal load carrying pallets 27, as compared with the same aircraft equipped with conventional pylon tanks 60. At speeds below about Mach 0.85 the aircraft 15 of this invention has negative incremental drag characteristics which is unusual, where an aircraft 15A with a pair of wing tanks 60 has an incremental drag area approaching two. Aircraft 15B equipped with three tanks 60 has a somewhat greater incremental drag due to the external stores. As speed increases, the aircraft 15 has significantly less drag increase than either aircraft 15A or 15B, and what is of greater significance is the greater drag penalty incurred by the aircraft 15A in order to carry a lesser load of fuel than aircraft 15. For example, at supersonic speeds the increase in incremental drag of aircraft 15 is only about 60% of that for the aircraft 15A with two pylon tanks 60, while the pallet volume is increased about 25%.

It is significant that each of the load carrying pallets is provided with only 5 mechanical load bearing connections to the aircraft fuselage 16, and all of the mechanical connections make use of existing hardpoints on the aircraft. The forward connection is a pin 52 engaged in the plate 53 for taking lateral loads and insures that the pallet will not deflect during aircraft maneuvers. The remaining load bearing points are paired and include upper and lower connections 39 and 43 at the principal bulkhead 29 and additional upper and lower connections 47 and 51 at the remaining principal bulkhead 31. The installation or removal of each load carrying pallet is achieved by the use of currently available fork lift vehicles.

While the foregoing description of a load carrying pallet seen in FIGS. 4 through 10 has indicated that a liquid load could be handled, it is seen in FIGS. 11 and 11A that a pallet 27A for alternate payloads may be constructed along the lines already described for the pallet 27. Pallet 27A is provided with a forward bulkhead 29A and an aft bulkhead 31A in order to carry the attachment means previously described in FIGS. 7 and 9 respectively. The outer skin 35A of the pallet 27A is, in this instance, provided with a series of access doors in which similar doors 62 are provided in the pallet compartment section 30A between the bulkheads 29A and 31A. Forward of the bulkhead 29A there is provided an enlarged access door 63, and a further access door 64 is provided adjacent the door 63. The view of FIG. 11A is typical of all of the access doors, in that it shows the doors to be hinged at the upper longitudinal edge and to close along the bottom margin.

One example of the utility for a load carrying pallet of the character seen in FIG. 11 at 27A can be exemplified by utilizing the compartment 30A serviced by access door 62 for carrying hardware items such as cameras or military sensor equipment, and similar items. The access door 64 will provide access for the installation of radar or similar sensor equipment, while the access door 63 would be located at a compartment carrying avionic equipment. It is also understood that the pallet 27A can be used to carry commercial items of a size that would be expected to fit within the volume of the pallet.

The pallets of this invention are streamlined in accordance with the "area rule" which blends the cross sectional area of the pallets with the basic aircraft cross section so that the combined shape will result in the pallets producing a small impact on the aircraft. The impact includes reduction of drag or minimized drag increase, no significant change of stability and control characteristics, minimization of frontal area, and no significant change in the wetted area of the basic aircraft. By conforming the pallets to blend with existing fuselage and wing root lines, the sources of interference drag normally experienced with pylon tanks or slipper wing tanks are eliminated. At the same time supersonic drag is minimized, and conforming the pallet installation to the fuselage area the effect on the air flow over the wing is kept to a minimum.

The foregoing description of a preferred load carrying pallet has set forth the principal characteristics of the invention. It is of course understood that modifications may be made in the structure and configuration of the load carrying pallet in order to adapt the same to the configuration of the wing root areas of the aircraft selected for taking advantage of the uniqueness and load carrying capacity of the present load carrying pallets.

What is claimed is:

1. In an aircraft a fuselage and wing meeting at a wing root area constituted by surfaces having a predetermined surface configuration; an elongated load carrying and enclosing pallet comprising a hollow body having a fixed geometry presenting an exposed wetted surface outwardly of said wing root area and other surfaces presented to and conforming substantially to said predetermined surface configuration of said fuselage and wing; means between said aircraft fuselage and other surfaces and spaced along the length of said hollow body and securely connecting said hollow body to the aircraft; and means carried by said hollow body in position engaging and forming a seal between the margins of said wetted surfaces and said fuselage and wing root area having said predetermined surface configuration.

2. In an aircraft having a wing and fuselage providing wing root areas at each side of the fuselage, said root areas having surfaces extending longitudinally of the aircraft, the improvement of load carrying pallets positionable in the root areas adjacent the longitudinal surfaces, each such pallet consisting of a hollow body having an exterior aerodynamically configured skin surface and other surfaces substantially matching the surfaces of the root areas, attachment means between the fuselage and hollow body supporting said hollow body in position, said attachment means including principal bulkheads in said hollow body in longitudinally spaced relation, fixed element in the fuselage matching the spacing of said bulkheads and detachable means connecting said bulkheads with said fixed elements, and other means restraining the hollow body against separation from the fuselage.

3. The improvement of claim 2, wherein there are seals carried by and extending between the hollow body and wing root area to exclude pressure build-up between the aircraft wing root area surfaces and the other surfaces of said hollow body.

4. The improvement of claim 2, wherein said bulkheads divide the hollow interior of said pallet into a plurality of compartments for the stowage of transportable means.

5. The improvement of claim 2, wherein said other means includes a pin projecting from said hollow body adjacent the forward end, and a plate in the wing root area formed with a pin receiving aperture.

6. A load carrying pallet for use with aircraft comprising an elongated fixed geometry body defining an internal load carrying space separate from the aircraft and constituted by an outer wall normally exposed to the ambient air and forming an aerodynamically clean skin surface extending between longitudinally directed upper and lower margins, a series of cooperating ribs connected together to form frames spaced along the pallet and supporting said outer wall skin surface against external air loads and weight of loads placed inside the pallet, other walls constituted by upper and inboard skin surfaces mounted on said frames to be presented to the aircraft out of the ambient air and to extend longitudinally of said pallet and connect with said upper and lower margins of said outer wall skin surface to complete the closure for the body, bulkhead means in the body in longitudinally spaced relation to divide the body into compartments, means carried by said bulkhead means to project outwardly of said other walls in position to act as attachments for connecting the body to an aircraft, said outer wall skin and other wall skin surfaces combining to form a streamlined body shape, and seal means carried along said upper and lower margins of said outer wall skin.

* * * * *